United States Patent [19]

Wakamatsu

[11] 4,361,352
[45] Nov. 30, 1982

[54] BUMPER FOR VEHICLES
[75] Inventor: Fumio Wakamatsu, Okazaki, Japan
[73] Assignee: Aisin Seiki Kabushiki Kaisha, Kariya, Japan
[21] Appl. No.: 148,725
[22] Filed: May 12, 1980
[30] Foreign Application Priority Data
May 21, 1980 [JP] Japan ................. 54/062462
[51] Int. Cl.³ ............................................ B60R 19/08
[52] U.S. Cl. ................................... 293/120; 293/109
[58] Field of Search ................ 293/109, 117, 120, 121
[56] References Cited
U.S. PATENT DOCUMENTS

| 3,666,310 | 5/1972 | Burgess et al. | 293/120 |
|---|---|---|---|
| 3,722,876 | 3/1973 | Schwenk | 293/120 |
| 3,897,095 | 7/1975 | Glance et al. | 293/120 |
| 4,030,735 | 6/1977 | Jacob et al. | 293/122 |
| 4,050,689 | 9/1977 | Barton et al. | 293/110 |
| 4,073,528 | 2/1978 | Klie | 293/122 |
| 4,088,357 | 5/1978 | Klie et al. | 293/122 |
| 4,116,893 | 9/1978 | Flanagan | 293/109 |
| 4,134,610 | 1/1979 | Lindewall | 293/109 |

Primary Examiner—Joseph F. Peters, Jr.
Assistant Examiner—Ross Weaver
Attorney, Agent, or Firm—Finnegan, Henderson, Farabow, Garrett & Dunner

[57] ABSTRACT

A bumper for vehicles includes a rim, a foamed plastic form positioned within the rim for absorbing shock, a reinforcement member for reinforcing the foamed plastic form and for sealing the form from deleterious effects of water, and a plurality of apertures defined by the reinforcement member for integrally joining the reinforcement member and the rim upon setting of a molten plastic material contained therein as a result of a molding operation during which the rim is formed.

6 Claims, 8 Drawing Figures

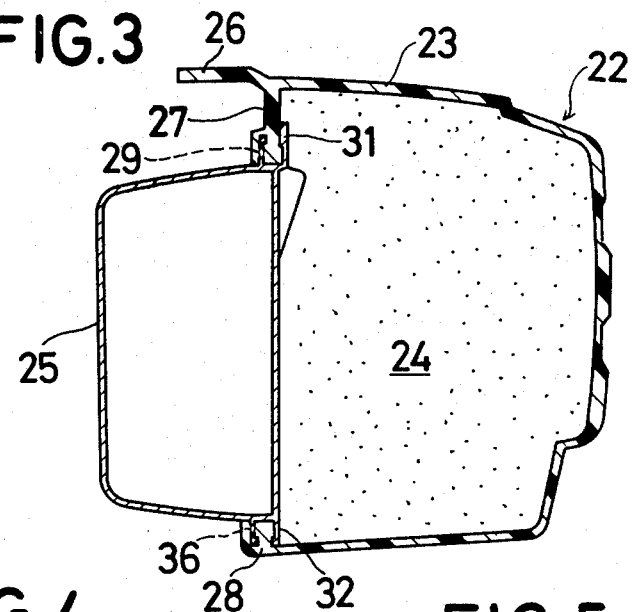
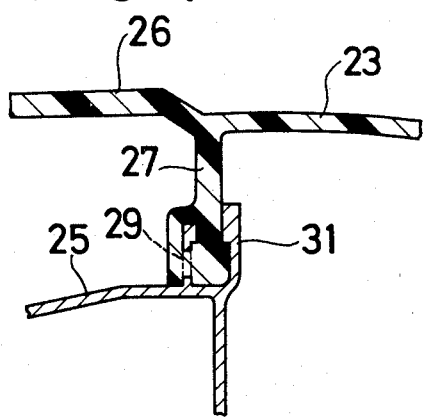
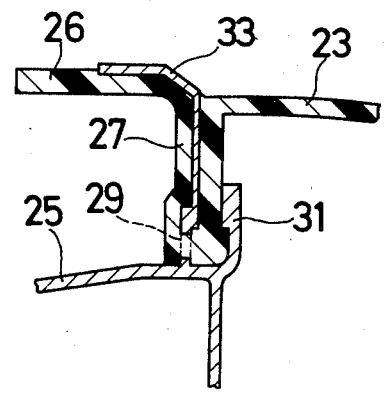
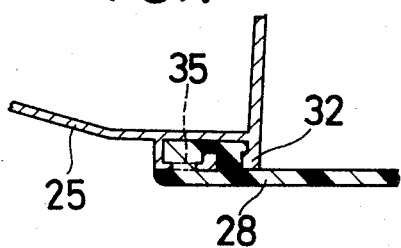
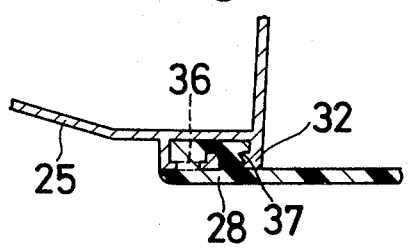

bumper 22 of FIG. 3 is assembled by inserting foamed ure-

BUMPER FOR VEHICLES

BACKGROUND OF THE INVENTION

1. Field of the Invention

The present invention relates to a bumper, and more particularly to a bumper for vehicles.

2. Description of the Prior Art

In a conventional bumper 10 for vehicles of the type shown in FIGS. 1 and 2, a foamed urethane form 12 is inserted into a rim 11 comprising a material such as plastic urethane, thereby absorbing the impact force upon collision of the vehicle. In order to attach the bumper 10 to a front surface of a vehicle body (not shown), the foamed urethane form 12 is first inserted into the rim 11. A plurality of bolts 13 and 14 are then inserted through holes 17 and 18 which are respectively defined by section 15 that extends inwardly from rim 11 and inward end section 16. Rim 11 and reinforcement member 19 are integrally joined by bolts 13 and 14 extending through holes 20 and 21 of the reinforcement member 19. The method of manufacturing a bumper 10 described wuth respect to FIGS. 1 and 2 is complicated and difficult. Moreover, since the foamed urethane form 12 is slightly exposed to the atmosphere at each end section of the rim 11, water will flow from these end sections, as well as through holes 17, 18, 20 and 21, and cause deleterious changes in the characteristics of the foamed urethane. The essential functioning of the bumper in absorbing impact forces may therefore be impaired.

SUMMARY OF THE INVENTION

An object of the present invention is to provide an improved bumper for vehicles which obviates the aforementioned drawbacks of the described conventional bumper.

A further object of the present invention is to provide an improved bumper for vehicles which integrally affixes the reinforcement member to the rim and prevents them against separation.

A still further important object of this invention is to provide an improved bumper for vehicles which protects the characteristics of a foamed urethane form inserted within a rim.

Another object of this invention is to provide an improved bumper for vehicles which is relatively simple and includes a minimum number of parts.

Additional objects and advantages of this invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention as embodied and broadly described herein, this invention is directed to a bumper for vehicles which includes a rim member formed as a result of a molding operation, a foamed urethane form positioned within said rim member to absorb shocks to which the bumper is subjected, and a reinforcement member to reinforce the bumper and positioned rearwardly of said form and fixed to said rim member when the latter is formed, the reinforcement member having a plurality of apertures through which molten material such as urethane is poured to form said rim member integrally fixed to the reinforcement member upon setting of the molten material.

The rim member has an extended portion and an inward and lower end portion whereat it is fixed to the reinforcement member. The reinforcement member comprises a flange portion to provide more rigid fixation to the rim member and, in one embodiment of the invention, also comprises a section which extends to the outside of the extended portion of the rim member, and, in another embodiment of the invention, comprises a restraining member inserted between the reinforcement member and the extended portion of said rim member.

In yet another embodiment of the invention, the reinforcement member comprises a plurality of apertures transversely formed in the region where it is fixed to the lower end portion of the rim member to prevent separation therebetween. And, in yet another embodiment of the invention, a plurality of wave portions are formed on the reinforcement member to provide more rigid fixation with said rim member upon setting of the molten material contained thereat as a result of the molding operation.

BRIEF DESCRIPTION OF THE DRAWINGS

Various other features, objects and attendant advantages of the present invention will become self-evident when considered in connection with the accompanying drawings wherein:

FIG. 3 is a sectional view which shows a preferred embodiment of a bumper for vehicles according to the invention;

FIG. 4 is an enlarged sectional view of a portion of FIG. 3;

FIG. 5 is generally a similar view to FIG. 4 but shows a second embodiment of the invention;

FIG. 7 is generally a similar view to FIG. 4 but shows a fourth embodiment of the invention; and FIG. 8 is generally a similar view to FIG. 4 but shows a fifth embodiment of the invention.

DETAILED DESCRIPTION OF THE PREFERRED EMBODIMENT

Figure 1:
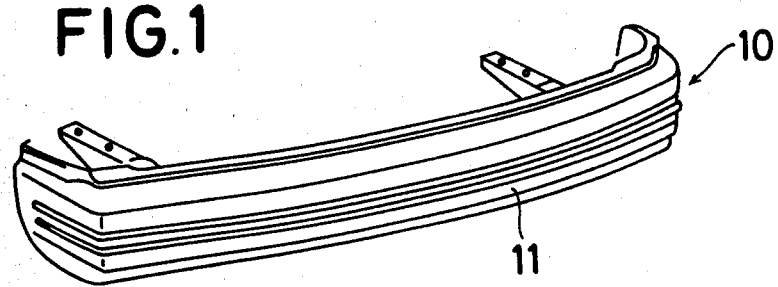
FIG. 1 is an isometric view of a conventional bumper for vehicles.
Figure 2:
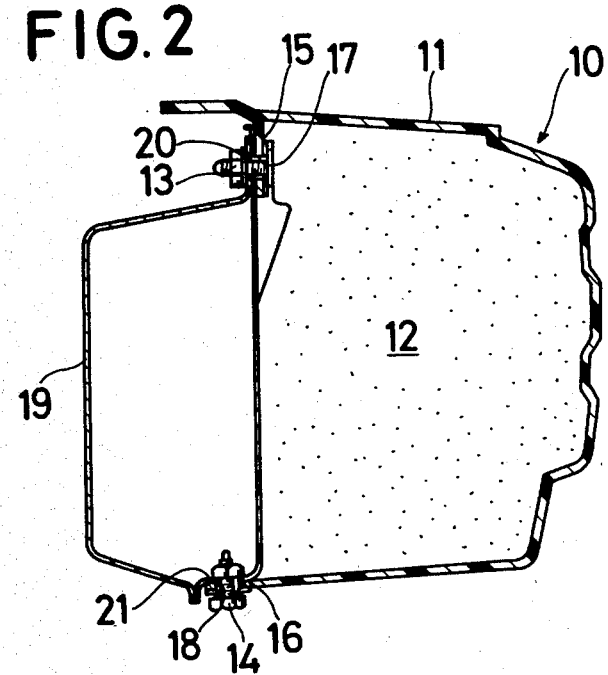
FIG. 2 is a sectional view of a conventional bumper for vehicles.

Referring now to FIG. 3, a bumper 22 for vehicles is shown as having a rim 23 with flange portions 31 and 32, a form 24 positioned within rim 23 as a shock absorbing member, and a reinforcement member 25 to reinforce the bumper located rearwardly of form 24. For exemplary purposes only, rim 23 may comprise a plastic material such as urethane, and form 24 may comprise foamed urethane.

A portion 27 extends integrally from inward and upper located end portions 26 of rim 23. A plurality of apertures 29 and 30 are formed in the reinforcement member 25 at extended portion 27 and inward and lower end portion 28 of rim 23 to join and prevent separation of rim 23 from reinforcement member 25 as explained hereafter.

In accordance with the invention, the bumper assembly 22 of FIG. 3 is assembled by inserting foamed urethane form 24 into a mold (not shown) and setting reinforcement member 25 at a predetermined position with respect thereto. A molten plastic material such as molten urethane is then poured through apertures 29 and 30 to fill the mold and thereby form rim 23 in integral relationship with reinforcement member 25 as shown in FIG. 3. During the molding procedure, the foamed urethane form 24 is completely encased by the molten urethane thereby hermetically sealing it and preventing water that may collect in the bumper from changing the characteristics of the foamed urethane. Apertures 29 and 30 provide conduits through which the molten urethane is poured into the mold and also function to release air and gas during molding. Upon setting of the molten urethane contained in the mold and apertures 29 and 30, rim 23 and reinforcement member 25 are firmly affixed and cannot be separated easily.

FIG. 5 shows a second embodiment of the invention wherein reinforcement member 25 includes an extension 33 positioned in the extended portion 27 of rim 23 and extending to the outside of inward and upper end portion 26. The partial outward exposure of reinforcement member 25 provides an attractive appearance and additional support.

Figure 6:
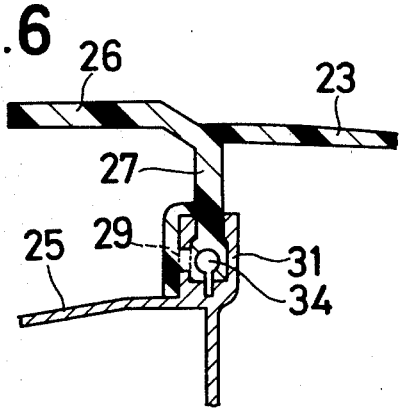
FIG. 6 is generally a similar view to FIG. 4 but shows a third embodiment of the invention.

FIG. 6 illustrates a third embodiment of the invention wherein a restraining member 34 is inserted between the reinforcement member 25 and the extended portion 27 of rim 23 during the molding operation. This provides a more rigid fixation of the rim 23 and reinforcement member 25. Restraining member 34 is preferably key-shaped, although other shapes are acceptable, and may comprise a metal such as iron or aluminum, for example.

FIGS. 7 and 8 respectively show fourth and fifth embodiments of the invention wherein a plurality of apertures 35 (FIG. 7) and 36 (FIG. 8) are transversely formed on the reinforcement member 25 in the region where the reinforcement member is fixed to the lower end portion 28 of rim 23. In these embodiments, rim 23 and reinforcement member 25 are thereby more rigidly fixed with respect to each other and are not easily separated. In the embodiment of FIG. 8, a plurality of wave portions 37 are also formed on the reinforcement member 25 in the region where the reinforcement member 25 is fixed to the lower end portion 28 of rim 23. This provides additional fixation between rim 23 and reinforcement member 25 upon setting of the molten urethane comprising rim 23, and further decreases the possibility of the two elements separating.

By the foregoing, there has been disclosed a preferred form of bumper for vehicles constructed in accordance with the present invention. It will be appreciated that various additions, substitutions, modifications and omissions may be made thereto without departing from the spirit of the invention.

What is claimed is:

1. A bumper for vehicles comprising:
    a molded plastic rim member formed from setting of molten material as a result of a molding operation,
    a foamed urethane form positioned within said rim member to absorb shocks to which the bumper may be subjected, and
    a reinforcement member to reinforce the bumper positioned rearwardly of said foamed urethane form and affixed to said rim member when the latter is formed, said reinforcement member having two flanges which define a groove therebetween, the upper portions of said two flanges having projections which form a narrowed portion in said groove, at least one of said two flanges defining at least one aperture which connects to said groove for passing molten material therethrough and into said groove to form said rim member, whereby said rim member and said reinforcement member are integrally fixed to each other upon setting of the molten material.

2. A bumper for vehicles for the type set forth in claim 1 wherein said two flanges extend upwardly.

3. A bumper for vehicles of the type set forth in claim 1 wherein a restraining member is positioned inside said groove to be integrally molded with said rim.

4. A bumper for vehicles of the type set forth in claim 2 wherein said reinforcement member further comprises two flanges which extend downwardly.

5. A bumper for vehicles of the type set forth in claim 2 wherein one of said two flanges comprises an extended section which extends along a vertically formed portion of said rim member, so that said section is integrally fixed to said reinforcement member.

6. A bumper for vehicles of the type set forth in claim 5 wherein said extended section further extends along an inward and upper end portion which is integrally formed on said rim member, so as to cover said reinforcement member.

* * * * *